(12) United States Patent
Narasimha et al.

(10) Patent No.: US 12,063,499 B2
(45) Date of Patent: Aug. 13, 2024

(54) LATENCY REDUCTION IN 5G AND 6G NETWORKS

(71) Applicant: Intel Corporation, Santa Clara, CA (US)

(72) Inventors: Murali Narasimha, Lake Oswego, OR (US); Yujian Zhang, Beijing (CN); Fatemeh Hamidi-Sepehr, San Jose, CA (US); Qian Li, Beaverton, OR (US); Mustafa Emara, Munich (DE)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 17/394,681

(22) Filed: Aug. 5, 2021

(65) Prior Publication Data

US 2022/0038893 A1   Feb. 3, 2022

Related U.S. Application Data

(60) Provisional application No. 63/061,695, filed on Aug. 5, 2020.

(51) Int. Cl.
| | |
|---|---|
| *H04W 12/033* | (2021.01) |
| *G06F 21/60* | (2013.01) |
| *H04L 5/00* | (2006.01) |
| *H04L 9/40* | (2022.01) |
| *H04W 72/0446* | (2023.01) |
| *H04W 80/02* | (2009.01) |
| *H04W 84/04* | (2009.01) |

(52) U.S. Cl.
CPC ........ *H04W 12/033* (2021.01); *G06F 21/602* (2013.01); *H04L 5/0044* (2013.01); *H04L 63/166* (2013.01); *H04W 72/0446* (2013.01); *H04W 80/02* (2013.01); *H04W 84/042* (2013.01)

(58) Field of Classification Search
CPC ........... H04W 12/033; H04W 72/0446; H04W 80/02; H04W 84/042; G06F 21/602; H04L 5/0044; H04L 63/166
See application file for complete search history.

(56) References Cited

U.S. PATENT DOCUMENTS

| | | | |
|---|---|---|---|
| 2019/0223078 A1* | 7/2019 | Sirotkin | H04L 45/34 |
| 2019/0246310 A1* | 8/2019 | Han | H04W 28/04 |
| 2022/0095332 A1* | 3/2022 | Li | H04W 72/23 |
| 2022/0159465 A1* | 5/2022 | Shrestha | H04W 12/0431 |
| 2022/0256436 A1* | 8/2022 | Guo | H04W 40/36 |

* cited by examiner

*Primary Examiner* — Ayoub Alata
(74) *Attorney, Agent, or Firm* — Schwegman Lundberg & Woessner, P.A.

(57) ABSTRACT

An apparatus and system for reducing URLLC latency are described. A single packet mode is described in which, when a packet arrives at the PDCP layer for transmission, an indication is sent to a scheduler with the expected size of the packet after ciphering. The packet is then sent to the RLC layer and concurrently submitted to the ciphering engine to enable ciphering to occur in parallel with the other activities. The scheduler determines the expected TB size for transmission of the packet by determining the size of the PDCP, MAC, and RLC headers. The scheduler matches the resource allocation for transmission to the expected TB size.

20 Claims, 12 Drawing Sheets

LATENCY REDUCTION IN 5G AND 6G NETWORKS

PRIORITY CLAIM

This application claims the benefit of priority under 35 U.S.C. 119(e) to U.S. Provisional Patent Application Ser. No. 63/061,695, filed Aug. 5, 2020, which is incorporated herein by reference in its entirety.

TECHNICAL FIELD

Embodiments pertain to wireless communications. In particular, some embodiments relate to latency reductions communications in $5^{th}$ generation (5G) and sixth generation (6G) networks.

BACKGROUND

The use and complexity of wireless systems, which include 5G and networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
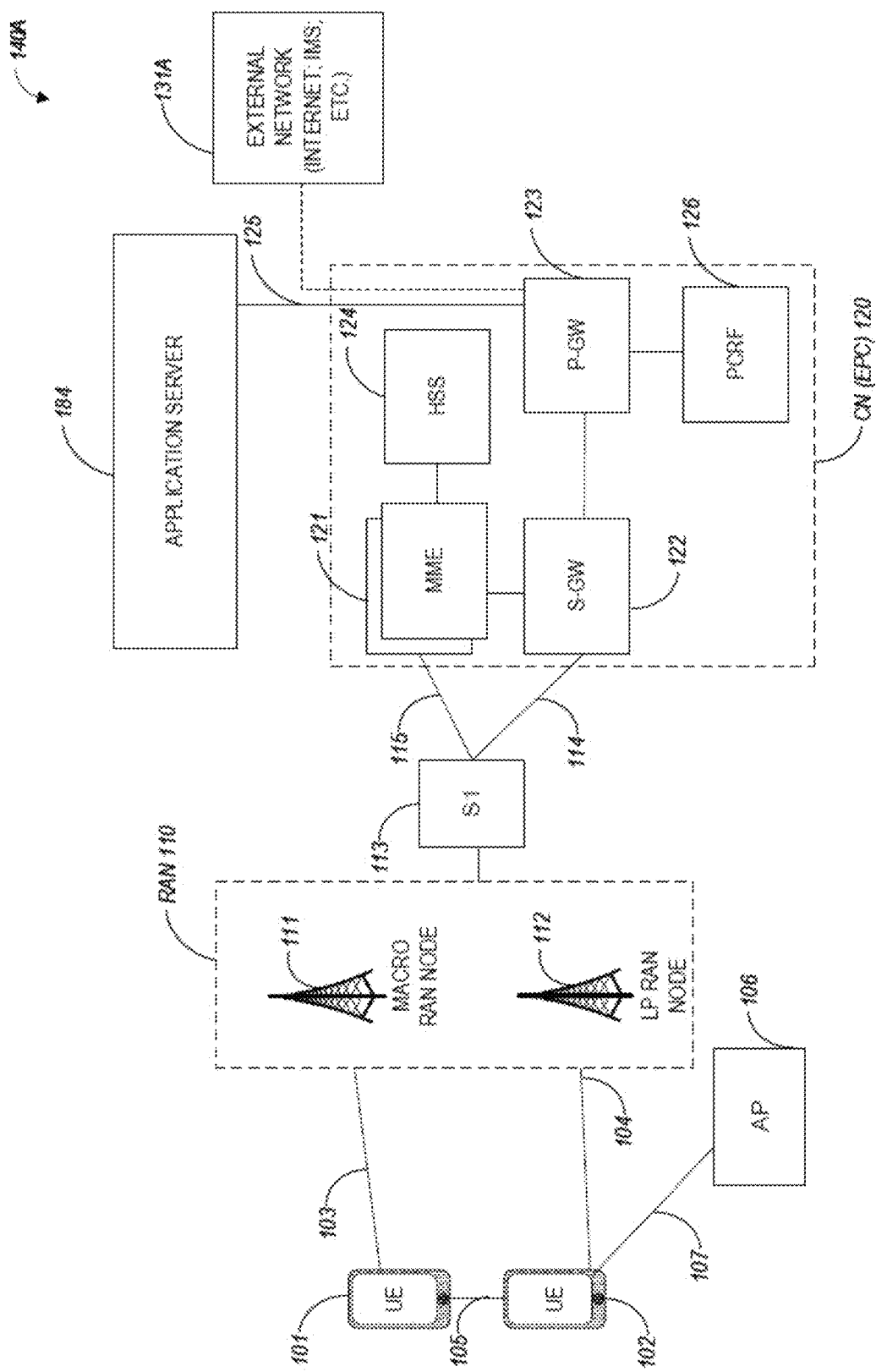
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-MMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMIC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102, In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMES 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (CPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120, in addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G network core (5GC) 120. The NG-RAN 110 can include a plurality of nodes, such as gNBs and NG-eNBs. The core network 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
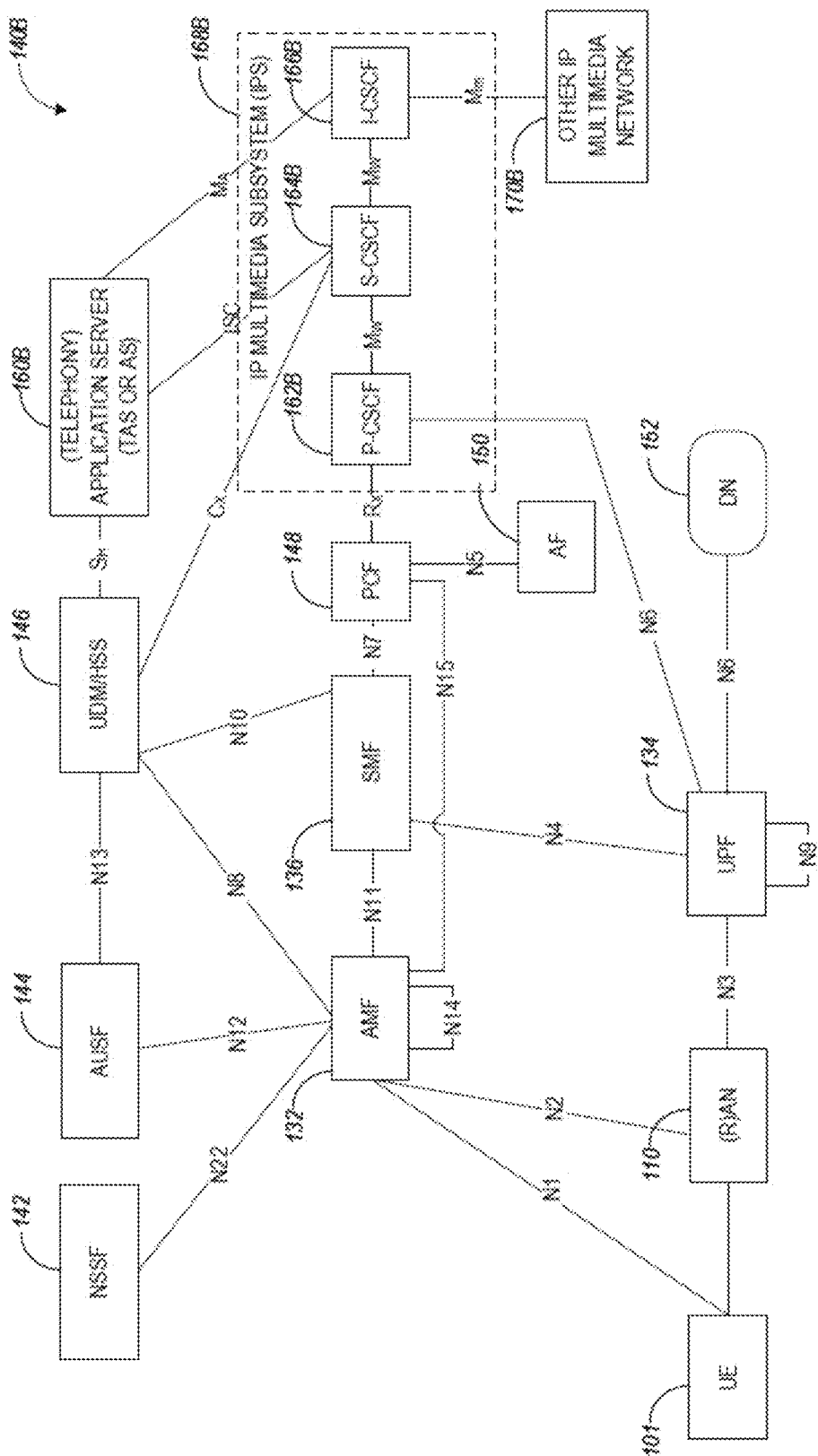
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NE's), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
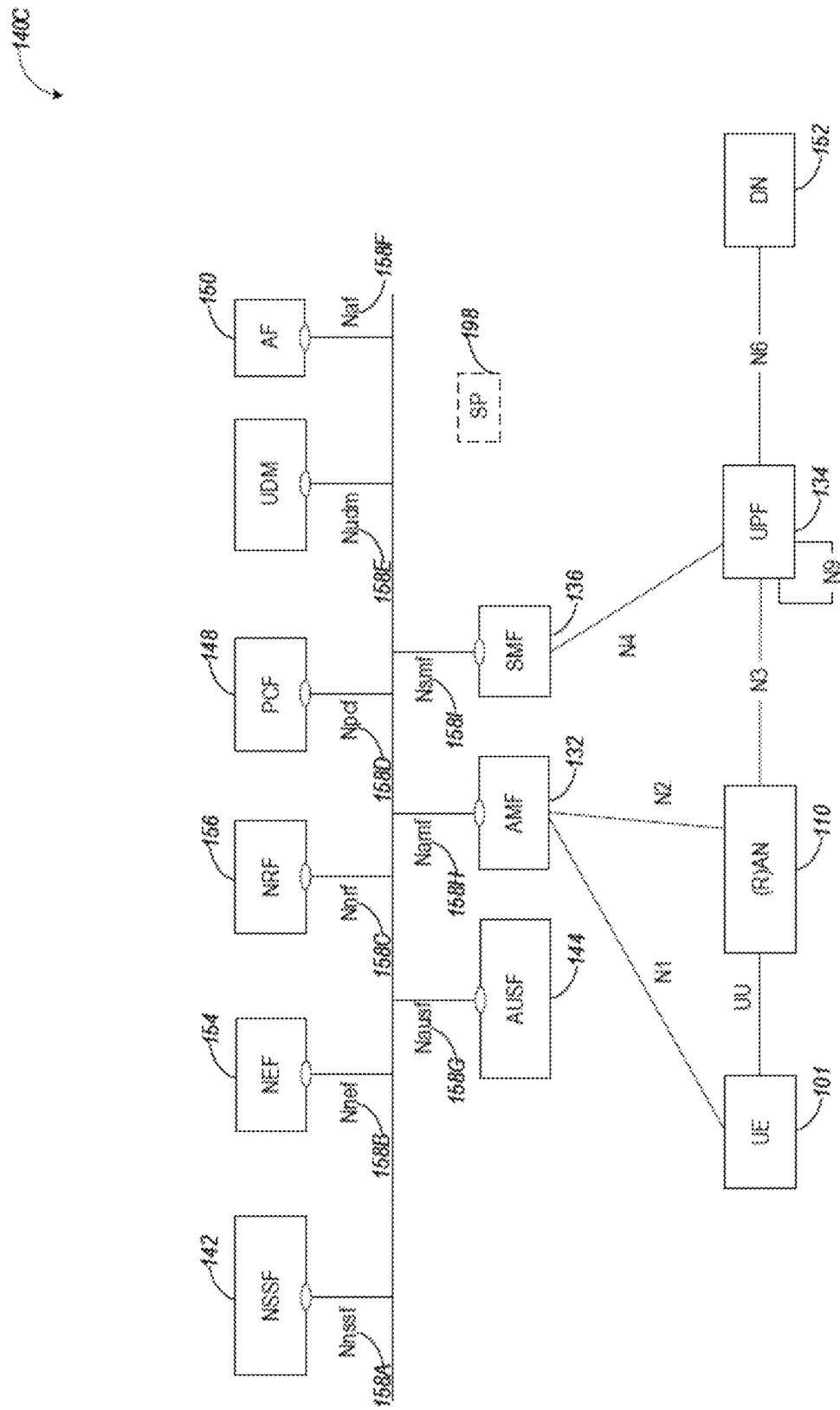
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NU) 154 and a network repository function (NU) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NU 156), Nnssf 158A (a service-based interface exhibited by the NSSF 142), Nausf 158O (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
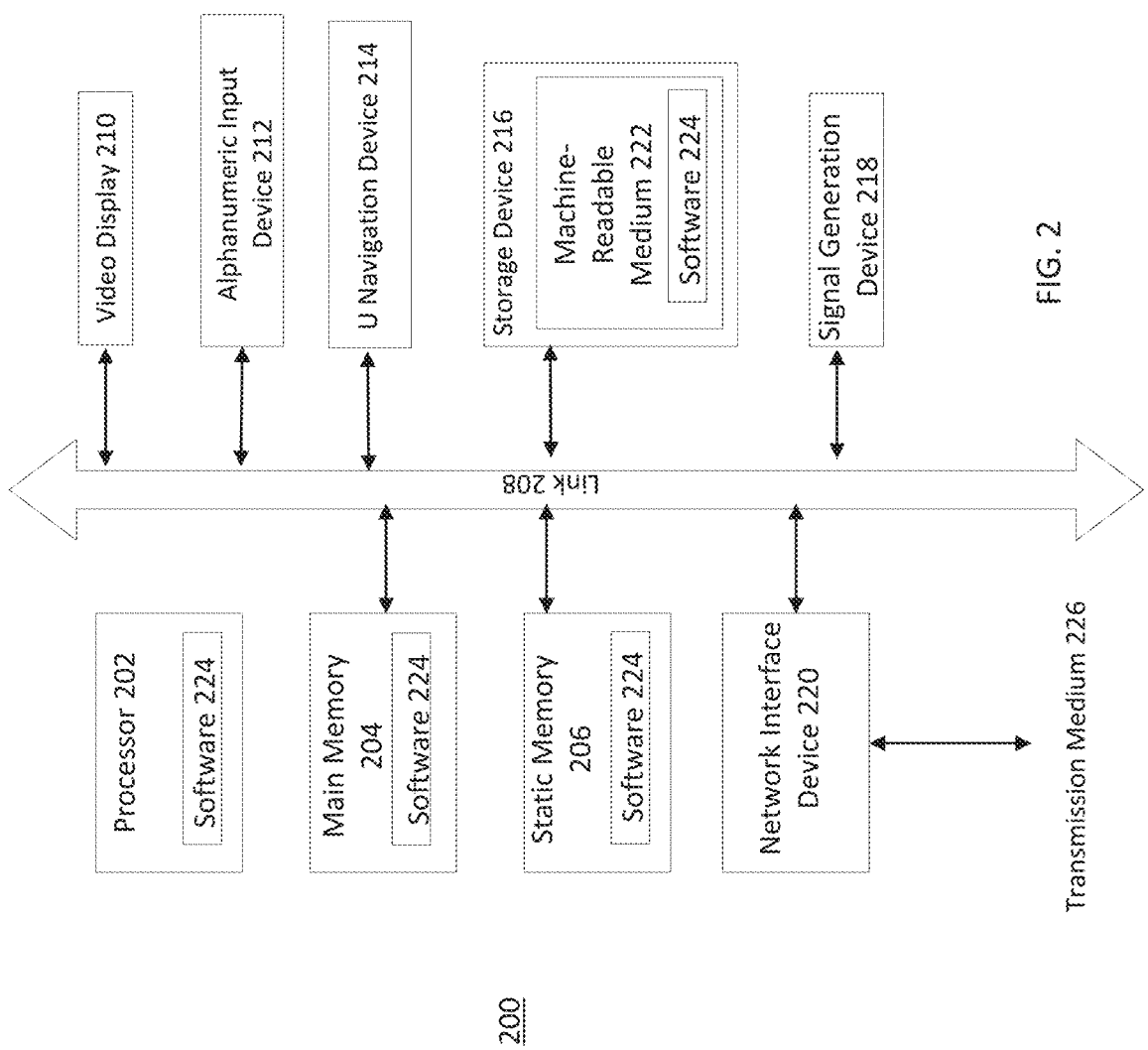
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse), in an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (CPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mohitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA). Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PIT), Mobile Telephone System (MTS). Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mohitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11.bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications)

communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-fated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/Wi-Gig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data hit vectors to the corresponding symbol resources.

Some of the features in this document are defined for the network side, such as access nodes (ANs) including APs, eNBs, NR or gNBs note that this term is typically used in the context of 3GPP 5G/6G communication systems, etc. A UE may take this role as well and act as an AP, eNB, or gNB; that is some or all features defined for network equipment may be implemented by a UE. In addition, later generation ANs (e.g., $6^{th}$ generation gNBs) may be used.

Ultra-reliable low-latency communication (URLLC) is used in variety of scenarios, including for time-critical processes and industrial internet of things (IIOT) applications, whether real-time or non-real time. Reducing latency in URLLC applications is desirable, particularly for real-time/time-critical processes. NR can achieve a 1 ms user plane latency. For next generation technologies, the goal is to further reduce the latency. The lowest latency is seen in good radio conditions, that is, when no Hybrid Automatic Repeat Request (HARQ) or ARQ retransmissions are used and a single shot transmission is adequate.

One methodology to lower latency is to further reduce the Transmission Time Interval (TTI). For example, a single symbol transmission can be considered. However, shorter TTIs accommodate less data, which can lead to segmenting packets before transmission. Segmentation of packets in turn leads to increased user plane latency. Therefore, other techniques may be used to perform packet processing differently to avoid or minimize segmentation.

In particular, to achieve low latency, NR provides the following: short slot lengths (via larger subcarrier spacing (SCS) at higher frequencies); data transmission in durations shorter than a slot (as short as 2 symbols in DL); a flexible time-domain duplexing (TDD) slot structure (a slot containing both DL and UL symbols); preemption of enhance mobile broadband (eMBB) data: ongoing DL eMBB data transmission can be punctured by URLLC data; semi-persistent scheduling: Preconfigured resources eliminating performance of physical downlink control channel (PDCCH) decoding; additionally, for uplink configured grants can be used to reduce scheduling requests; short physical uplink control channel (PUCCH): one or two symbol PUCCH to minimize HARQ feedback delay; frequent scheduling requests (SR): UEs can be configured with scheduling request occasions as often as 2 symbols to minimize delay for uplink resource allocation; retransmission without HARQ feedback: a configuration can enable 2, 4 or 8 repetitions without waiting for HARQ feedback; front loaded demodulation reference signals (DMRS): DMRS early in the slot to enable early channel estimation; frequency first mapping of data to resource elements to allow symbol by symbol processing (rather than buffering all symbols of slot).

Figure 3:
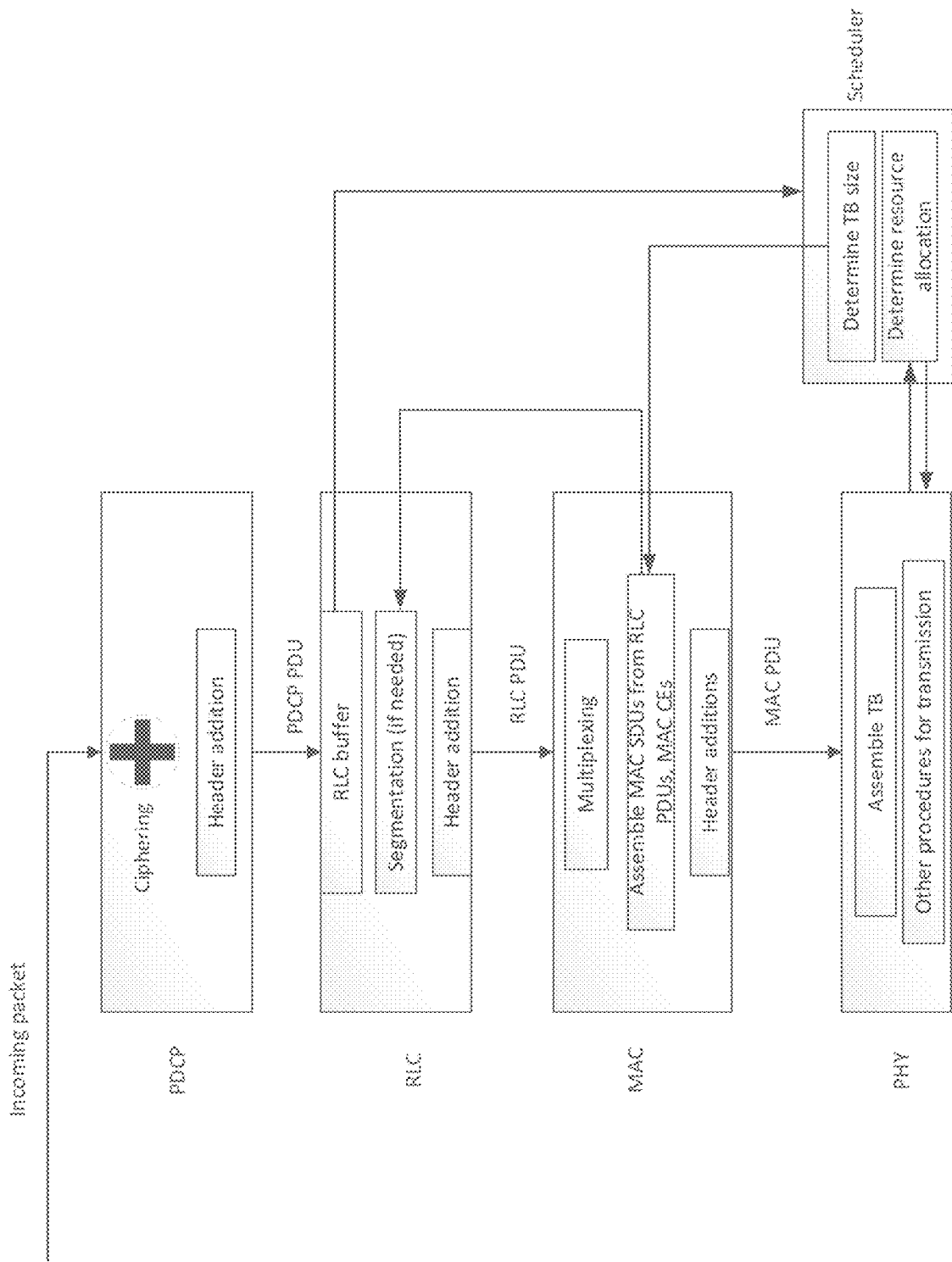
FIG. 3 illustrates user plane packet processing in accordance with some embodiments.

FIG. 3 illustrates user plane packet processing in accordance with some embodiments. In particular, FIG. 3 shows a simplified and abstract view of downlink packet processing for transmission. When a packet is received for transmission at the Packet Data Convergence Protocol (PDCP) layer, it is ciphered using a security algorithm. A PDCP header is added and the resulting PDCP packet data unit (PDU) is delivered to the Radio Link Control (RLC) layer. The presence of data in the RLC buffer causes the scheduler to determine resource allocation and a TB size that can be supported in that resource allocation. The TB size is indicated to the medium access control (MAC) layer. The MAC layer coordinates with the RLC layer to assemble MAC service data units (SDUs) and generates a MAC PDU. This may involve segmentation of an RLC PDU if there is an RLC PDU that does not fit in the MAC PDU in its entirety. The MAC PDU is submitted to the physical (PHY) layer, which appends a cyclic redundancy code (CRC) and performs coding, modulation and resource mapping.

However, Ciphering is one of the more computationally intensive tasks, particularly as packets get larger. The steps in the RLC, MAC and PHY protocol layers do not start until the ciphering process is completed and the PDCP PDU has been submitted to the RLC layer. The resource allocation (from the scheduler, in coordination with the PHY layer) is not tailored to the packet that is to be transmitted. In general, the resource allocation is based on total buffered data, scheduling metrics and channel conditions. Consequently, a TB can include a portion of an RLC PDU or portions of more than one RLC PDU. At the receiver, this imposes latency due to buffering and reordering (i.e., data received within a TB cannot be quickly delivered to PDCP without buffering). In addition, the MAC header is computed in real time, based on the TB size, available RLC PDUs etc. The RLC headers can in principle be computed in advance; however, they may be adjusted in a PDU that is to be segmented.

Figure 4:
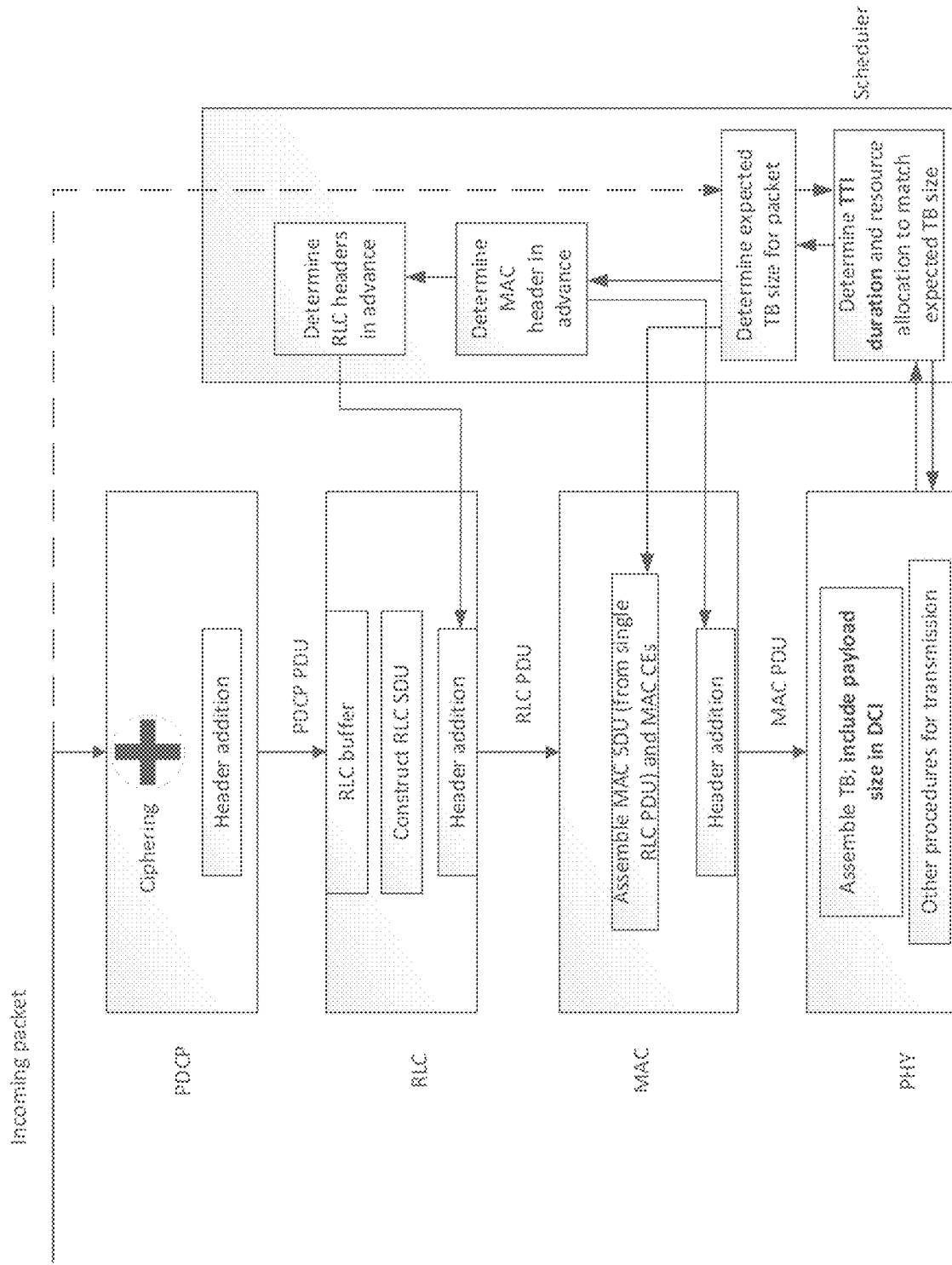
FIG. 4 illustrates single packet mode processing in accordance with some embodiments.

Accordingly, FIG. 4 illustrates single packet mode processing in accordance with some embodiments. As shown in FIG. 4, when a packet arrives at the PDCP layer for transmission, an indication is sent to the scheduler with the expected size of the packet after ciphering, before the packet is sent to the RLC layer. The packet is also submitted to the ciphering engine. This enables ciphering to occur in parallel with the other activities.

Assuming single packet transmission and based on the above indication, the scheduler is aware of the TTI duration to fit the expected packet. This allows matching the resource allocation to the expected packet size (more specifically, to ensure that the allocated resources are no larger than what is used for the packet. This enforces a single packet mode, where there is also 1:1 mapping between RLC PDU and MAC PDU). Particularly, the scheduler determines the expected TB size for transmission of the packet by assuming appropriate exact overhead at each layer. The TB size computation is based on a single RLC PDU and a single MAC PDU to be carried in the TB. The scheduler determines the TTI duration (number of OFDM symbols) and resource allocation to match the TB size. It is noted that in the current NR design, the PRY layer does not provide TBS based on the packet size, Rather, as much data as possible would fit into a determined TBS.

The MAC header and the RLC header can be pre-computed (i.e., sequence numbers, MAC CEs to be sent, etc are all available), based on the indicated expected packet size (assuming a single RLC PDU and a single MAC PDU to be carried in the TB), and the resource allocation.

Once the ciphered PDCP PDU is submitted to the RIC buffer, the RLC layer can assemble the RLC PDU and then MAC layer can assemble the MAC PDU quickly and submit to PHY layer.

The PHY layer includes information about the payload size (i.e., size of actual data bits, excluding the protocol headers). This information can be included in the downlink control information (DCI) of the scheduling PDCCH or the MAC header. It is used to assist the processing at the receiver.

Figure 5:
FIG. 5 illustrates a transport block (TB) in accordance with some embodiments.
Figure 6:
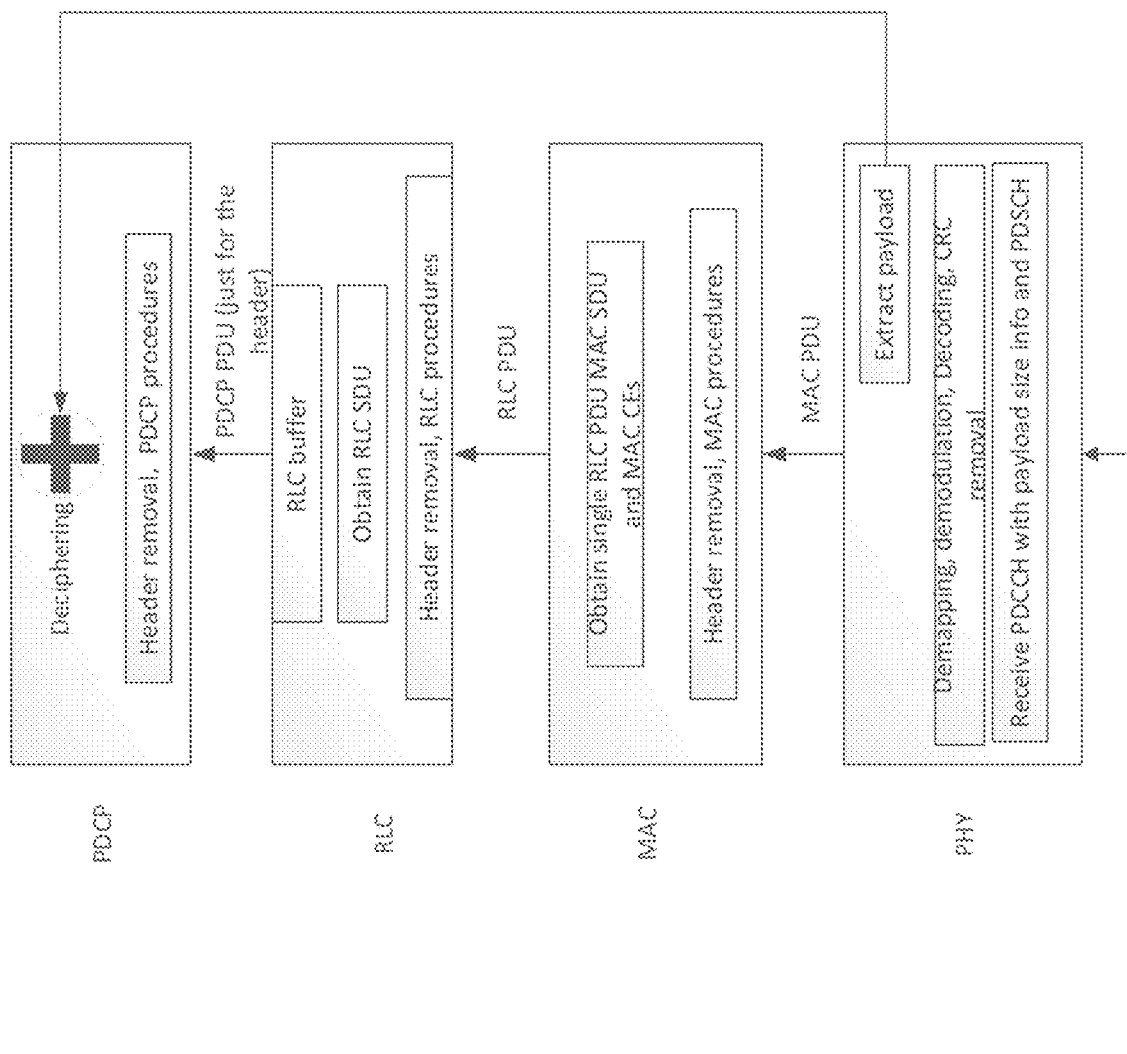
FIG. 6 illustrates single packet mode receive operation in accordance with some embodiments.

FIG. 5 illustrates a transport block (TB) in accordance with some embodiments. This form allows the receiver to perform deciphering in the PDCP layer in parallel with other actions. FIG. 6 illustrates single packet mode receive operation in accordance with some embodiments. The receiver side processing for the single packet mode is shown in FIG. 6. The processing benefits from single packet mode of operation are more pronounced on the receiving side, as receiver knows in prior the size of headers and the starting location of the PDCP header in a TB (through mechanisms described below).

The UE receives the indication of the payload size in the PDCCH and the physical downlink shared channel (PDSCH). After removal of the CRC, the payload (ciphered PDCP SDU) is extracted.

The ciphered PDCP SDU is passed to the deciphering engine in PDCP, and the deciphering can start immediately. In parallel, the MAC PDU is passed to the MAC layer for normal MAC processing.

Normal MAC and RLC procedures are applied based on the MAC and RLC headers (i.e., update of count, windows etc).

Processing of the headers in parallel while deciphering is in progress implies that that the deciphering may complete and packet may be ready to be delivered to the application before lower layer procedures are complete. However, to ensure correct handling by MAC, RLC and PDCP layers, the packet is not delivered to the application until the MAC, RLC and PDCP layers successfully process the respective headers.

Application to a Split Central Unit (CU)/Distributed Unit (DU) Architecture

Figure 7:
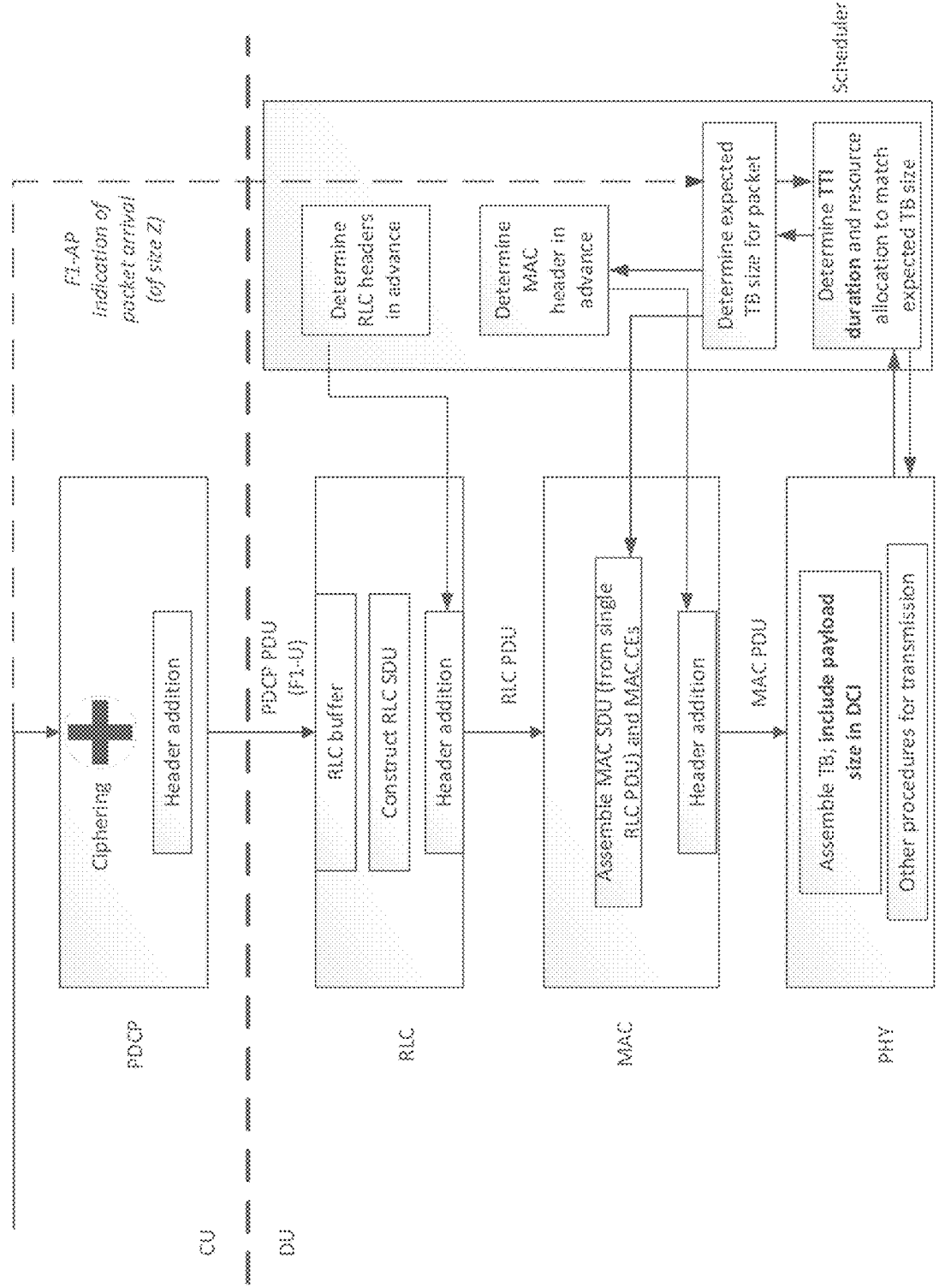
FIG. 7 illustrates downlink (DL) processing at a $5^{th}$ generation NodeB (gNB) in accordance with some embodiments.

FIG. 7 illustrates DL processing at a gNB in accordance with some embodiments. With a split CU/DU architecture (as in NR), the PDCP layer is placed in the CU and RLC/MAC/PHY layers are placed at the DU. As such, some signaling is performed between the CU and DU to enable the indication (if the CU and DU are both located in one gNB, the discussed indication can be internally performed).

A standardized interface (F1) is defined for data transfer between the CU and the DU, which may also carry the information for enabling the above design, and inform the DU about an incoming packet. Otherwise, the DU only knows about the incoming packet when the RLC SDU is sent. The details below apply the principles described above (FIG. 7) to the split CU/DU scenarios.

When a packet arrives at the CU, a "packet expected" indication is transmitted to the DU (scheduler), over the F1 interface, that a packet of a specific size will be available in the buffer. The size indicated is the size of the packet after encryption is performed (assuming encryption is configured) and the addition of the PDCP header. The packet expected indication can also include a time at which the packet (ciphered PDCP PDU) will be available at the DU (taking into account the duration for performing ciphering and the duration to transmit the packet), so that the DU (scheduler) knows when to allocate the resources. If the scheduler allocates the resources earlier and the ciphered PDU does not arrive, those resources will be wasted (unused). Such design is under the assumption that the processing (ciphering) duration is known at the PDCP layer and the PDCP layer can indicate the duration to the DU, in accordance. Generally, ciphering is a linear operation. As such, the larger the packet, the longer ciphering takes (i.e., while ciphering does not take a fixed duration, the duration is fairly predictable).

Upon receiving the packet expected indication, the DU scheduler determines a TB size for a transport block that includes only the expected packet as the payload and any protocol headers and physical layer overhead to be used. The scheduler then acquires a resource allocation from the physical layer to accommodate just the transport block. This can include determination of RLC and MAC headers in advance.

Concurrent with the resource allocation: the packet is subjected to PDCP layer processing, including ciphering. The resulting PDCP PDU is transmitted to the DU over the F1 interface. The RLC and MAC layers attach (pre-determined) headers to the PDU. The resulting transport block is transmitted using the resources that are allocated. By not waiting for PDCP, RLC and MAC processing (including ciphering) to initiate the resource allocation procedures, the data plane processing is quicker.

In the above operations, a single packet is mapped to a transport block (and consequently) a single PHY layer transmission. While such processing may be appropriate for very low latency traffic, it may not be appropriate for other types of traffic as it may be inefficient. Therefore, means are used to distinguish such operation from conventional operation, A "single packet" mode is defined and configured at UEs.

A message is transmitted from the DU to the UE indicating that the UE should operate in single packet mode (i.e., assume that each TB includes a single PDCP PDU). The message could be a higher layer message (e.g., RRC). However, in order to minimize delays, it may be preferred to transmit such a message as a physical layer indication (for example, in the PDCCH scheduling the first very low latency packet).

The duration for which the single packet mode applies may be indicated in the message. Alternatively, another message can be transmitted to revert UE to conventional operation. The configuration can be semi-static (e.g., via radio resource control (RRC)), semi-persistent (e.g. via MEC CE and triggered by physical control channel), or dynamic (e.g., via physical control channel). Note that when operating in single packet mode, the UE knows apriori the size of PDCP RLC and MAC headers. Alternatively, the "single packet mode" can be configured for certain resources, e.g. for certain semi-persistent scheduling/configured grant (SPS/CG) configurations.

Figure 8:
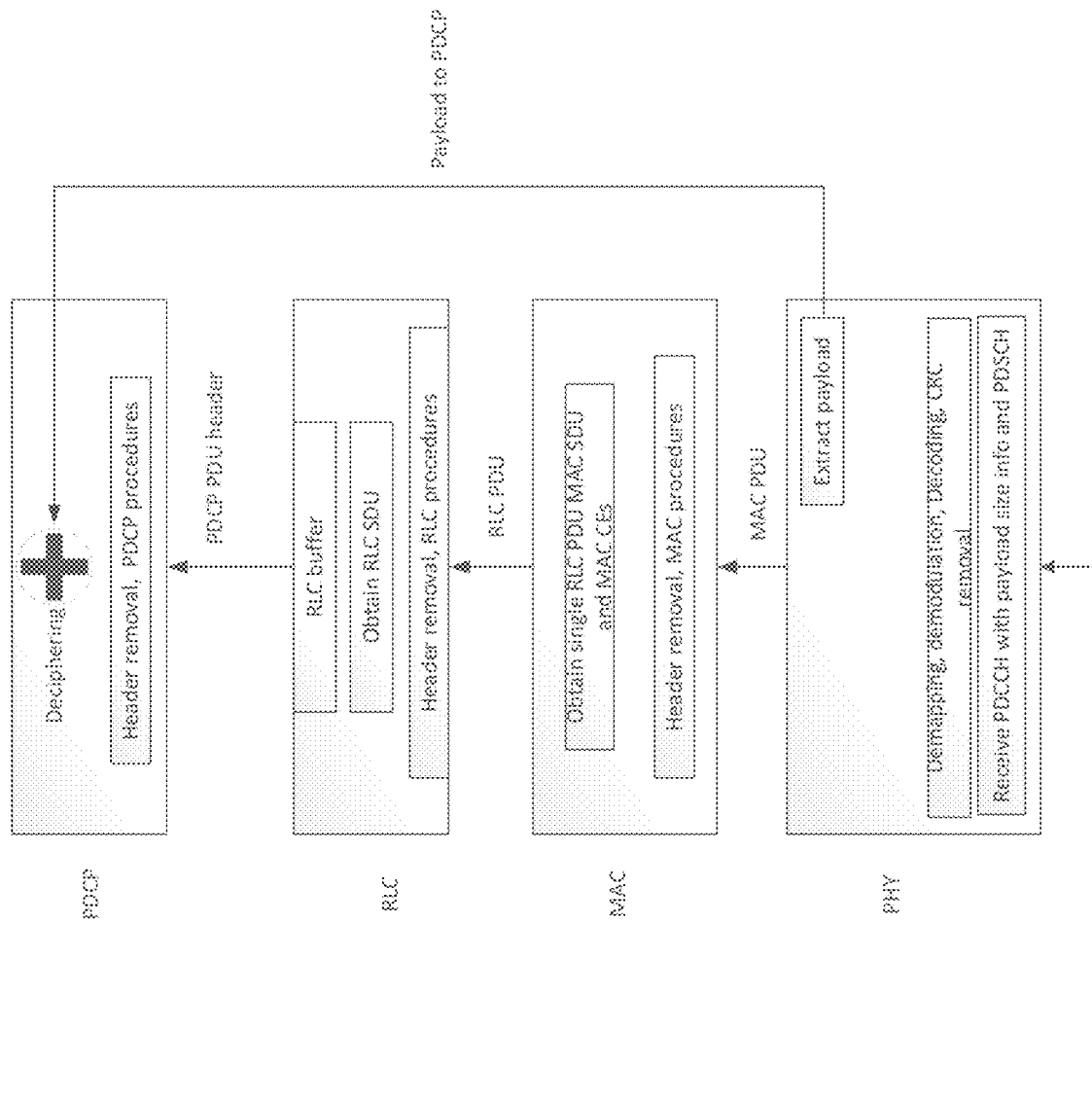
FIG. 8 illustrates DL processing at a UE in accordance with some embodiments.

FIG. 8 illustrates DL processing at a UE in accordance with some embodiments. When a UE receives a single packet mode transport block (see FIG. 8): the UE extracts the payload (i.e., the portion of the TB that is not the RLC or MAC headers) and submits the payload to the PDCP layer. Note that the deciphering operation also uses the PDCP sequence number and the bearer identity. The PDCP sequence number can be obtained from the PDCP header (given that the header sizes are known in single packet mode) and the bearer identity can be determined based on the logical channel identity in the MAC sub-header. Note that extracting and submitting just the payload to the PDCP layer avoids delays in MAC and RLC due to the sequential processing of packet queues (i.e., there can be other packets that are to be processed before this one). The PDCP layer performs deciphering of the payload. If deciphering is successful and the RLC layer successfully receives and verifies the RLC header, the payload is submitted to the upper layer.

Concurrently, the transport block is submitted to the MAC layer and subsequently to the RLC layer for processing. This ensures RLC functions are still performed; i.e., RLC sequence numbers are processed and Ur state is maintained, and RLC ARQ can be performed. As above, the RLC layer receives and verifies the RLC header.

Uplink Packet Processing in Single Packet Mode

Figure 9:
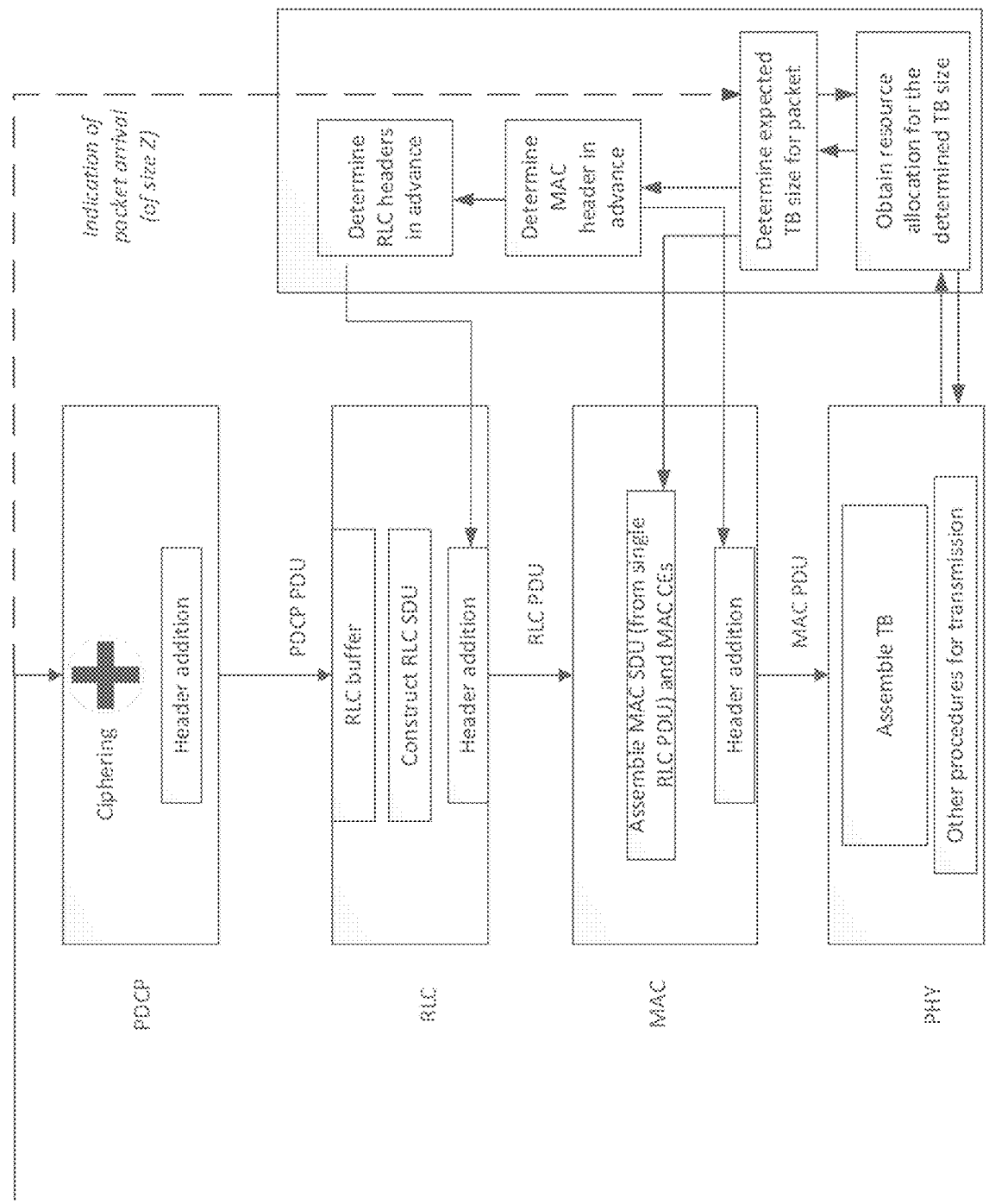
FIG. 9 illustrates uplink (UL) processing at a UE in accordance with some embodiments.

FIG. 9 illustrates UL processing at a UE in accordance with some embodiments. For uplink data, the processing at the UE is shown in FIG. 9 (note that compared to the DL processing at the gNB, the expected packet indication is internal to the UE). Particularly, same principle can be applied in UL: when the packet arrives at PDCP in the UE, the packet can be indicated to the lower layers before performing the ciphering operation. However, all that indication is performed within the UE (without any signaling supported/specified). Unlike for the DL processing at the gNB, given that resource allocation is performed at the gNB, the UE obtains a suitable resource allocation.

Obtaining a suitable resource allocation by the UE can include the following: if the UE has multiple UL grants (including configured grants), the UE identifies the appropriate UL grant that can accommodate the expected TB size with minimal padding; alternatively, for very low latency traffic, the UE can choose the earliest available UL grant, Depending on the UL grant resource, the upper layer of the UE can generate packet that can fit into a TB; or alternatively, for single packet mode, the UE can transmit a scheduling request indicating the size of the transport block. The gNB responds with an UL grant of the requested size, which is used by the UE to transmit the packet.

Figure 10:
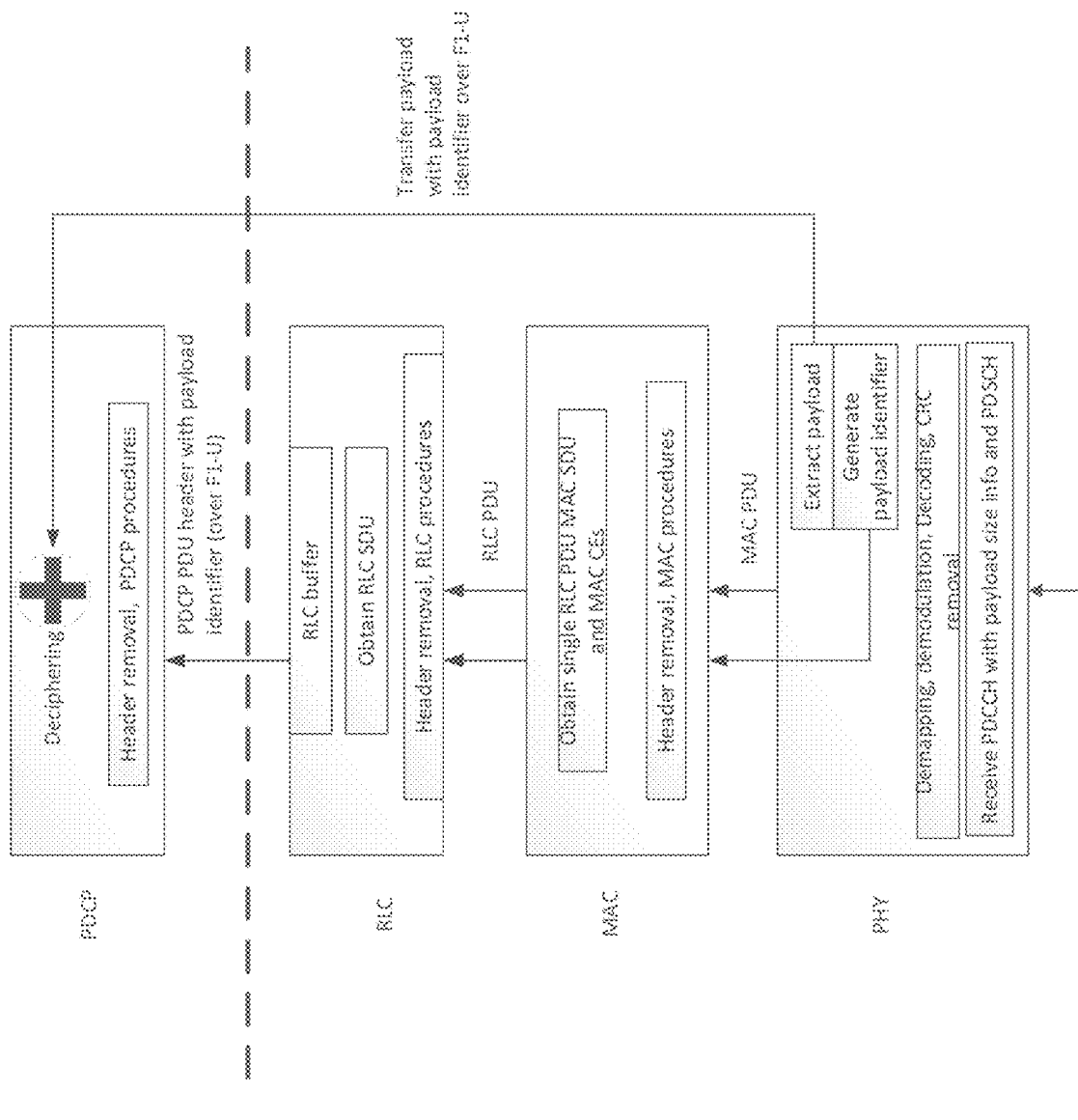
FIG. 10 illustrates alternative processing in accordance with some embodiments.

FIG. 10 illustrates alternative processing in accordance with some embodiments. At the DU, the receive procedure includes the following (see FIG. 10):

At operation 1, the DU extracts the payload (i.e., the portion of the TB that is not the RLC or MAC headers). Note that the gNB knows that the UE, is operating in single packet mode. This could be because the UL grant for the packet transmission explicitly indicates single packet mode transmission. Alternatively, the UE could be placed in a single packet mode for a certain time duration, Knowing that the received TB is a single packet mode transmission enables identification of the bits in the TB that correspond to different protocol headers.

At operation 2, the DU generates a unique payload identifier. The payload with the payload identifier is transmitted to the CU over the F1 interface along with information used for deciphering. The information used for deciphering includes the PDCP sequence number and the radio bearer identity. The sequence number can be obtained from the PDCP header. Alternatively, the entire PDCP header could be transmitted to the CU in this operation.

Each radio bearer has a separate (ITP-U tunnel over the F1 interface. Thus, the bearer ID can be determined by the CU based on the GTP-U tunnel over which the information is received, Note that by extracting and transmitting just the payload to the CU, delays in the MAC and RLC may be avoided due to the sequential processing of packet queues (i.e., there can be other packets that need to be processed before this one). Transmitting the payload to the CU enables deciphering to proceed even before the MAC and RLC layers process the packet.

At operation 3, the PDCP layer performs deciphering of the payload. If deciphering is successful and the PDCP layer has successfully completed matching the payload identifier and identifying the corresponding payload that can be submitted to upper layer, the payload is submitted to the upper layer.

Concurrently, at operation a, the transport block is submitted to the MAC layer and subsequently to the RLC layer for processing. This ensures RLC functions are still performed; i.e., RLC sequence numbers are processed and RLC state is maintained, and RLC ARQ can be performed. At operation b, the payload identifier and payload size are also provided to the MAC layer and the RLC layer. At operation c, the PDCP header (if it is not already transmitted at operation 2 above) and the payload identifier are transferred to the PDCP layer in the CU over the F1-U. The RLC layer obtains the PDCP header by away the payload from the RLC SDU.

At operation d, the PDCP layer matches the payload identifier received in operation 3 and operation c and identifies the corresponding payload that can be submitted to upper layer of deciphering succeeds).

As an alternative to the payload identifier described above, the payload identifier could be a pre-defined hash function. Then, the payload identifier may not be included in operation 2 above. The CU computes and stores the payload identifier using the hash function. Operation c includes the payload identifier computed as the hash function of the payload.

Handling of Error between RLC, MAC and PDCP Layers

On the receiving side, currently the error handling behavior at each of MAC, RLC, and PDCP are specified. Particularly, if an error is detected in the header, the Whole packet is discarded. Particularly, at the receiver side, the deciphering engine cannot deliver to the application layer right after the deciphering operation. The confirmation from the CU that the header is correct is still used by the deciphering engine, before the deciphering engine can proceed for the delivery. If a deciphering error is encountered, this is to be accounted for as the MAC and RLC layers would normally drop the PDU if they find any error in the header. Particularly, if the RLC or MAC drop any PDU entirely, corresponding handling is to occur since otherwise, the PDCP layer waits for the RLC/MAC clearance so that the PDCP layer can deliver/submit to the application layer.

Alternative Procedure (Bypassing RLC)

The UE processing shown above assumes RLC and MAC processing. As an alternative, for single packet mode, the RLC can be operated in transparent mode. With such an approach, steps a-d above may be avoided no processing is used other than extracting the payload and transmitting to the CU), Note however, that RLC ARQ may be unable to be accommodated with the RLC in transparent mode.

Application to a Setup Without Split CU/DU

If the base station architecture is such that there is not a CU/DU split, the above procedures can still be applied. However: the packet expected indication is internal to the base station and is not expected to be standardized (e.g., this kind of parallel processing can be handled by gNB implementation). In addition, the configuration of the single packet mode and corresponding behavior is to be standardized.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure, it is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for an access node (AN), the apparatus comprising:
processing circuitry configured to:
determine arrival of a packet for ultra-reliable low-latency communication (URLLC) at a Packet Data Convergence Protocol (PDCP) layer;
in response to arrival of the packet at the PDCP layer, encode:
prior to the packet being sent to a Radio Link Control (RLC) layer, an indication of a size of the packet after ciphering for transmission to a scheduler engine, and
the packet to a ciphering engine for ciphering to create a ciphered packet;
determine, at the scheduler engine during the ciphering, an expected transport block (TB) size for transmission of the packet; and
encode the ciphered packet for transmission using the expected TB size; and
a memory configured to store the expected TB size.

2. The apparatus of claim 1, wherein the scheduler engine is configured to determine a transmission time interval (TTI) duration to fit the packet and match a resource allocation to the expected TB size.

3. The apparatus of claim 2, wherein:
the scheduler engine is configured to assume an appropriate overhead at each of a plurality of layers of a protocol stack of a protocol that is implemented by the processing circuitry to determine the expected TB size, and
the plurality of layers includes the PDCP layer, a medium access control (MAC) layer, and a Radio Link Control (RLC) layer.

4. The apparatus of claim 3, wherein the scheduler engine is configured to compute the expected TB size based on a single RLC packet data unit (PDU) and a single MAC PDU to be carried in a TB.

5. The apparatus of claim 4, wherein the scheduler engine is configured to compute the expected TB size based on a pre-computed MAC header and RLC header, the indication, and the resource allocation.

6. The apparatus of claim 1, wherein the processing circuitry is configured to:
submit the ciphered packet to a Radio Link Control (RLC) buffer of an RLC layer,
in response to submission of the ciphered packet to the RLC buffer, assemble a RLC packet data unit (PDU) at the RLC layer, the RLC PDU containing an RLC header,
submit the RLC PDU to a medium access control (MAC) layer,
assemble a MAC PDU at the MAC layer based on the expected TB size, the MAC PDU containing a MAC header and MAC control element (CE), and
submit the MAC PDU to a physical (PHY) layer fix assembly and transmission from the AN.

7. An apparatus for a distributed unit (DU) of an access node (AN), the apparatus comprising:
processing circuitry configured to:
decode, from a central unit (CU) of the AN, an indication of an expected packet for ultra-reliable low-latency communication (URLLC);
in response to reception of the indication, determine a size of a transport block (TB) for the expected packet and a resource allocation to accommodate the TB based on the size of the TB;
decode, after reception of the indication, an actual packet associated with the expected packet; and
encode, for transmission, the actual packet in a TB for the actual packet using the resource allocation; and
a memory configured to store the resource allocation.

8. The apparatus of claim 7, wherein the indication indicates arrival at the CU of a packet that is to be ciphered.

9. The apparatus of claim 7, wherein the indication includes the size of the expected packet, the size of the expected packet is after encryption and addition of a Packet Data Convergence Protocol (PDCP) header.

10. The apparatus of claim 7, wherein the indication includes an estimate of a time at which the actual packet is to be available for transmission by the DU, the time configured to take into account a duration for performing ciphering and a duration for transmission of the packet.

11. The apparatus of claim 7, wherein the processing circuitry is configured to determine the size of the TB for a TB that consists of a payload of the expected packet, at least one protocol header, and physical layer overhead to be used for the expected packet, the at least one protocol header comprising at least one of a medium access control (MAC) header or a Radio Link Control (RLC) layer.

12. The apparatus of claim 7, wherein:
concurrent with the resource allocation, the actual packet is subjected to Packet Data Convergence Protocol (PDCP) layer processing, including ciphering, and
the processing circuitry is further configured to attach a predetermined medium access control (MAC) header and Radio Link Control (RLC) header to the actual packet prior to transmission of the actual packet.

13. The apparatus of claim 7, wherein the processing circuitry is further configured to encode, for transmission to a user equipment (UE), an indication for the UE to operate in single packet mode in which:
each TB has a single Packet Data Convergence Protocol (PDCP) packet data unit (PDU), and
a size of each of a PDCP header, a medium access control (MAC) header, and Radio Link Control (RLC) header is predetermined.

14. The apparatus of claim 13, wherein the indication includes a duration for which the single packet mode applies.

15. The apparatus of claim 7, wherein:
the processing circuitry is further configured to indicate, to a user equipment (UE), to operate in single packet mode based on use of at least one semi-persistent scheduling (SPS) configuration or configured grant (CG) configuration to transmit the actual packet, and
in the single packet mode:
each TB has a single Packet Data Convergence Protocol (PDCP) packet data unit (PDU), and
a size of each of a PDCP header, a medium access control (MAC) header, and Radio Link Control (RLC) header is predetermined.

16. The apparatus of claim 7, wherein the processing circuitry is further configured to:
decode, from a user equipment (UE), another packet,
extract a payload of the other packet,
generate a unique payload identifier,
obtain a Packet Data Convergence Protocol (PDCP) sequence number of the other packet from a PDCP header of the other packet,
determine a radio bearer identity from a General Packet Radio Service (GPRS) Tunnelling Protocol User Plane (GTP-U) tunnel over which information to be used for deciphering is received by the DU, the information comprising the PDCP sequence number and radio bearer identity, and encode, for transmission to the CU, the payload, the payload identifier, and the information.

17. The apparatus of claim 16, wherein the processing circuitry is further configured to, in parallel with deciphering of the payload at the CU:
submit a transport block that contains the other packet to a medium access control (MAC) layer and subsequently to a Radio Link Control (RLC) layer for processing, and
provide the payload identifier and a payload size of the other packet to the MAC layer and the RLC layer.

18. The apparatus of claim 16, wherein the processing circuitry is further configured to determine that the UE is operating in single packet mode based on an uplink UL grant for transmission of the other packet that explicitly indicates single packet mode transmission.

19. A non-transitory computer-readable storage medium that stores instructions for execution by one or more processors of user equipment (UE), the one or more processors to configure the UE to, when the instructions are executed:
receive, from an access node (AN), an indication of a payload size of an ultra-reliable low-latency communication (URLLC) packet in at least one of a physical downlink control channel (PDCCH) or physical downlink shared channel (PDSCH);
receive, from the AN, a single packet mode transport block (TB) that contains the packet;
remove a cyclic redundancy code (CRC) from the packet;
extract a payload of the packet after removal of the CRC, the payload comprising a ciphered Packet Data Convergence Protocol (PDCP) service data unit (SDU);
in parallel operations:
decipher the payload in a PDCP layer, and
provide a medium access control (MAC) packet data unit (PDU) to a MAC layer for processing of a MAC header of the packet and a Radio Link Control (RLC) for processing of an RLC header of the packet; and
after the parallel operations are completed, deliver results of the parallel operations to lower layers of a protocol stack of a protocol that is implemented by the one or more processors.

20. The medium of claim 19, wherein the one or more processors further configure the UE to, when the instructions are executed, decipher the payload using a PDCP sequence number obtained from a PDCP header and bearer identity that is based on a logical channel identity in a MAC sub-header.

* * * * *